(12) United States Patent
Bishkin

(10) Patent No.: US 6,846,390 B1
(45) Date of Patent: Jan. 25, 2005

(54) METHODS FOR USING HYDROPHOBIC LIQUID TO COMPRESS STEAM

(76) Inventor: David Bruce Bishkin, 205 E. Butterfield Rd., Elmhurst, IL (US) 60126

( * ) Notice: Subject to any disclaimer, the term of this patent is extended or adjusted under 35 U.S.C. 154(b) by 128 days.

(21) Appl. No.: 10/237,826

(22) Filed: Sep. 9, 2002

(51) Int. Cl.⁷ .............................. B01D 3/00; F25B 1/02; F25B 1/08
(52) U.S. Cl. .............................. 203/24; 62/116; 62/501; 159/24.1; 159/24.2; 159/24.3; 203/26; 203/100; 203/DIG. 4; 203/DIG. 8
(58) Field of Search .............................. 203/14, 24, 26, 203/100, DIG. 4, DIG. 8, DIG. 9; 62/115, 116, 118, 119, 501; 159/24.1, 24.2, 24.3; 208/179, 365, 363, 353; 196/134, 155

(56) References Cited

U.S. PATENT DOCUMENTS

| | | | | |
|---|---|---|---|---|
| 1,961,211 A | * | 6/1934 | Graham | 208/361 |
| 4,030,985 A | * | 6/1977 | Barba et al. | 202/174 |
| 4,186,060 A | * | 1/1980 | Katz et al. | 203/26 |
| 4,282,070 A | * | 8/1981 | Egosi | 203/11 |
| 4,820,542 A | * | 4/1989 | de Mathan | 426/636 |
| 6,350,351 B1 | * | 2/2002 | Popov et al. | 202/205 |
| 6,365,005 B1 | * | 4/2002 | Schleiffarth | 203/1 |

* cited by examiner

*Primary Examiner*—Virginia Manoharan
(74) *Attorney, Agent, or Firm*—Ted Masters

(57) ABSTRACT

Methods for using a hydrophobic liquid, such as mineral oil, to compress steam include using a compressor to compress a mixture of steam and the hydrophobic liquid. One embodiment includes the steam to be compressed coming from a boiling aqueous solution in an evaporator. The steam compressed with a hydrophobic liquid is routed to a heat exchanger which thermally communicates with the evaporator to create more steam. The resulting mixture of condensed steam and hydrophobic liquid from the heat exchanger is routed to a water/hydrophobic liquid separator. The hydrophobic liquid is also recycled to the compressor from the water/hydrophobic liquid separator.

18 Claims, 4 Drawing Sheets

US 6,846,390 B1

METHODS FOR USING HYDROPHOBIC LIQUID TO COMPRESS STEAM

TECHNICAL FIELD

The present invention pertains generally to the compression of steam, and more particularly to the use of a hydrophobic liquid in the compression process.

BACKGROUND OF THE INVENTION

Ordinary water evaporators are notoriously expensive to operate since evaporating water requires large quantities of energy because of its high heat of vaporization. To evaporate large quantities of water a heat pump is often employed to efficiently recycle the heat of vaporization. One heat pump method is the mechanical vapor recompression process that when applied to the evaporation of water requires the direct compression of steam. The need for a rugged and simple steam compressor would greatly expand the use of mechanical vapor recompression for water evaporation. Other applications for a rugged and simple steam compressor might arise in any instance where the pressure of the steam available is too low for its intended purpose and must be upgraded by compression.

SUMMARY OF THE INVENTION

The present invention is directed to methods for using a hydrophobic liquid to compress steam. The methods are most often used in the context of mechanical vapor recompression (MVR), which is a method for evaporating water. In MVR, a compressor is used to boost the pressure of steam from the evaporator so that it will condense at a higher temperature. This enables the latent heat in the steam to be returned to the evaporator thus generating more steam. In this way the same heat is continuously reused. Other uses for the present invention include the general upgrading of steam pressure for general heating purposes.

In the methods of the present invention, a compressor evacuates steam, created in a heat exchanger. In the compressor, such as a liquid piston pump, the steam is compressed to a higher pressure and discharged along with a hydrophobic liquid, such as mineral oil, into the other side of the same heat exchanger. There the steam is condensed to water (condensate) giving up its heat of vaporization. The condensate and hydrophobic liquid are drained from the heat exchanger and into a water/hydrophobic liquid separator where the hydrophobic liquid is taken off the top of the condensate and evacuated back into the compressor.

In a useful embodiment of the invention, mineral oil, a material with a very high vapor pressure and immiscibility with water and with low viscosity, is used as a liquid compressant allowing the liquid piston pump to operate without flashing liquid compressant or absorbing the compressed vapor. Also, the mixture of oil and steam is allowed to pass directly to the heat exchanger without attempting to first separate the steam from the oil.

Further, liquid piston pumps are inexpensive, rugged, and quiet compared to positive two-lobed blower that is normally used in this application. The liquid piston pump is inexpensive and rugged compared to the centrifugal compressor that is also used in this application.

In accordance with an embodiment of the invention, a method for using a hydrophobic liquid to compress steam includes:

(a) providing steam;
(b) providing a hydrophobic liquid;
(c) providing a compressor having a steam input, a hydrophobic liquid input, and a compressed steam-hydrophobic liquid output;
(d) routing the steam to the steam input of the compressor;
(e) routing the hydrophobic liquid to the hydrophobic liquid input of the compressor; and,
(f) obtaining a mixture of compressed steam and hydrophobic liquid from the compressed steam-hydrophobic liquid output of the compressor.

In accordance with another embodiment of the invention, a method for using a hydrophobic liquid to remove water soluble material from an aqueous solution includes:

(a) providing an aqueous solution containing water soluble material;
(b) providing a hydrophobic liquid;
(c) providing a system for removing the water soluble material from the aqueous solution, the system including:
   An evaporator for receiving the aqueous solution, the evaporator having an aqueous solution input, a steam output, and a concentrated aqueous solution output. A heat exchanger transfers heat to the evaporator, the heat exchanger having a compressed steam-hydrophobic liquid input and a water-hydrophobic liquid output. The system further includes a water/hydrophobic liquid separator having a water-hydrophobic liquid input, a hydrophobic liquid output, and a water condensate output. A compressor has a steam input, a hydrophobic liquid input, and a compressed steam-hydrophobic liquid output. The steam input of the compressor is connected to the steam output of the evaporator, the hydrophobic liquid input of the compressor is connected to the hydrophobic liquid output of the water/hydrophobic liquid separator, the compressed steam-hydrophobic liquid output of the compressor is connected to the compressed steam-hydrophobic liquid input of the heat exchanger, and the water-hydrophobic liquid input of the water/hydrophobic liquid separator is connected to the water-hydrophobic liquid output of the heat exchanger.
(d) delivering the aqueous solution to the aqueous solution input of the evaporator;
(e) the compressor compressing a mixture of steam from the evaporator and hydrophobic liquid, thereby increasing the temperature of the mixture;
(f) routing the mixture from the compressed steam-hydrophobic liquid output of the compressor to the compressed steam-hydrophobic liquid input of the heat exchanger and thence through heat exchanger, thereby evaporating the aqueous solution and causing steam to be routed from the steam output of the evaporator to the steam input of the compressor;
(g) routing water and hydrophobic liquid from the water-hydrophobic liquid output of the heat exchanger to the water-hydrophobic liquid input of the water/hydrophobic liquid separator; and,
(h) routing the hydrophobic liquid from the hydrophobic liquid output of the water/hydrophobic liquid separator to the hydrophobic liquid input of the compressor.

Other aspects of the present invention will become apparent from the following detailed description, taken in conjunction with the accompanying drawings, which illustrate, by way of example, the principles of the invention.

DETAILED DESCRIPTION OF THE INVENTION

Figure 1:
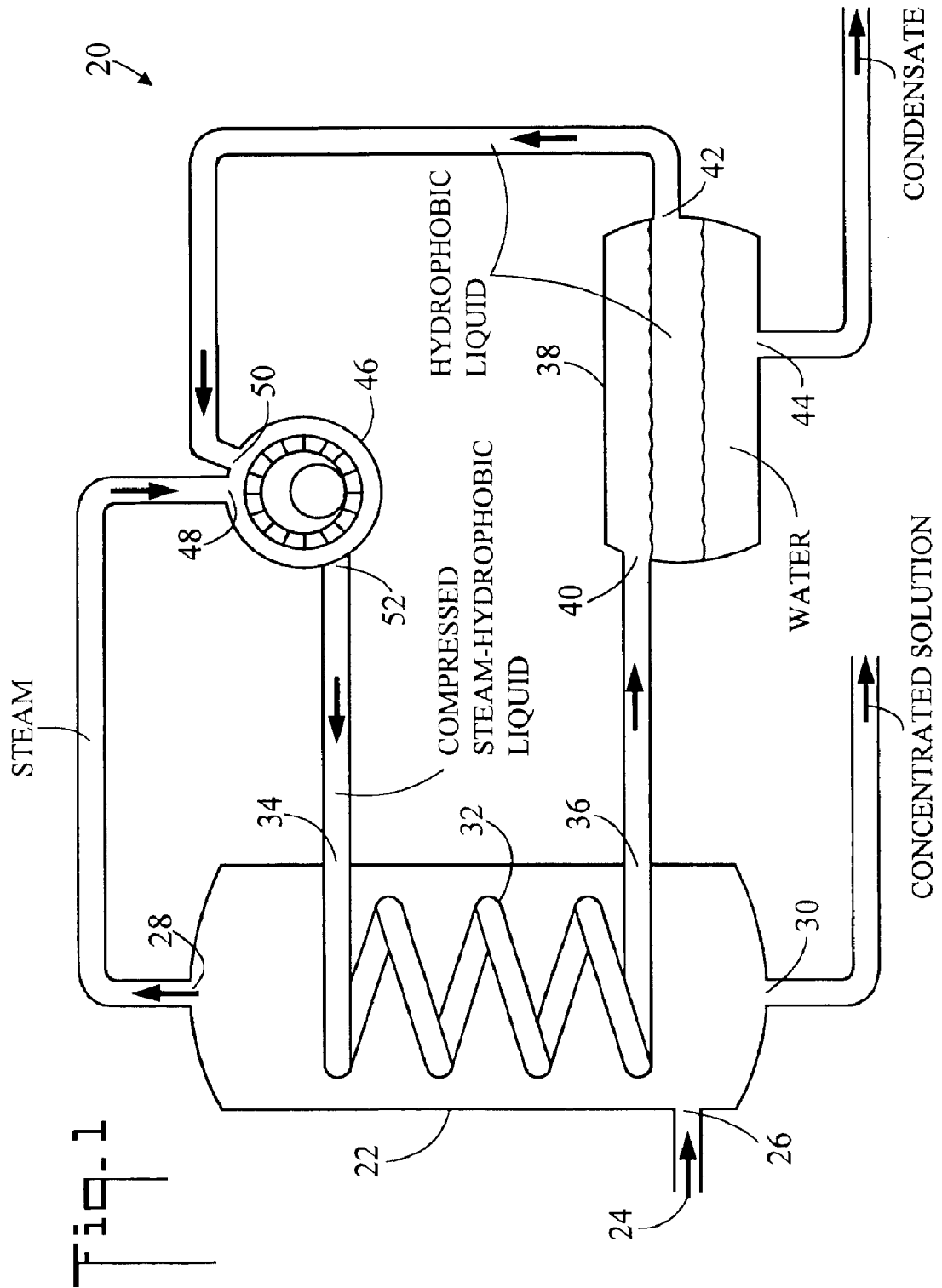
FIG. 1 is a flow diagram of a first system for using a hydrophobic liquid to compress steam.

Referring initially to FIG. 1, there is illustrated a flow diagram of a first system for using a hydrophobic liquid to compress steam, generally designated as 20. In the shown embodiment, first system 20 is utilized for removing a water soluble material from an aqueous solution, and includes an evaporator 22 for receiving the aqueous solution 24, evaporator 22 having an aqueous solution input 26, a steam output 28, and a concentrated aqueous solution output 30. A heat exchanger 32 transfers heat to evaporator 22, the heat exchanger 32 having a compressed steam-hydrophobic liquid input 34 and a water/hydrophobic liquid output 36. System 20 further includes a water/hydrophobic liquid separator 38 having a water-hydrophobic liquid input 40, a hydrophobic liquid output 42, and a water condensate output 44. A compressor 46 has a steam input 48, a hydrophobic liquid input 50, and a compressed steam-hydrophobic liquid output 52. Steam input 48 of compressor 46 is connected to steam output 28 of evaporator 22, hydrophobic liquid input 50, of compressor 46 is connected to hydrophobic liquid output 42 of water/hydrophobic liquid separator 38, compressed steam-hydrophobic liquid output 52 of compressor 46 connected to compressed steam-hydrophobic liquid input 34 of heat exchanger 32, and water-hydrophobic liquid input 40 of water/hydrophobic liquid separator 38 is connected to water-hydrophobic liquid output 36 of heat exchanger 32.

As used herein a hyphen ("-") means "and", such as in compressed steam-hydrophobic liquid input 34. This means that both compressed steam and hydrophobic liquid are present at input 34. Conversely, a slash ("/") means "from", such as in water/hydrophobic liquid separator 38. This means that water is separated from hydrophobic liquid in separator 38.

In a preferred embodiment of the invention, a hydrophobic liquid having a low viscosity and a low vapor pressure is utilized in system 20. A mineral oil such as XCELTHERM 600 manufactured by Radeo Industries, P.O. Box 305, La Fox, Ill. 60147 has been found useful.

Also in a preferred embodiment of the invention, compressor 46 comprises a liquid piston pump such as is available from Nash Engineering Company, 9 Trefoil Drive, Trumbull, Conn. 06611-1330. Further regarding compressor 46, it is noted that in the shown embodiment, steam input 48 and hydrophobic liquid input 50 comprise two separate physical inputs to compressor 46. It is also noted however that the steam 48 and hydrophobic liquid 50 inputs can be combined into one common compressor input with somewhat lessened results.

Figure 2:
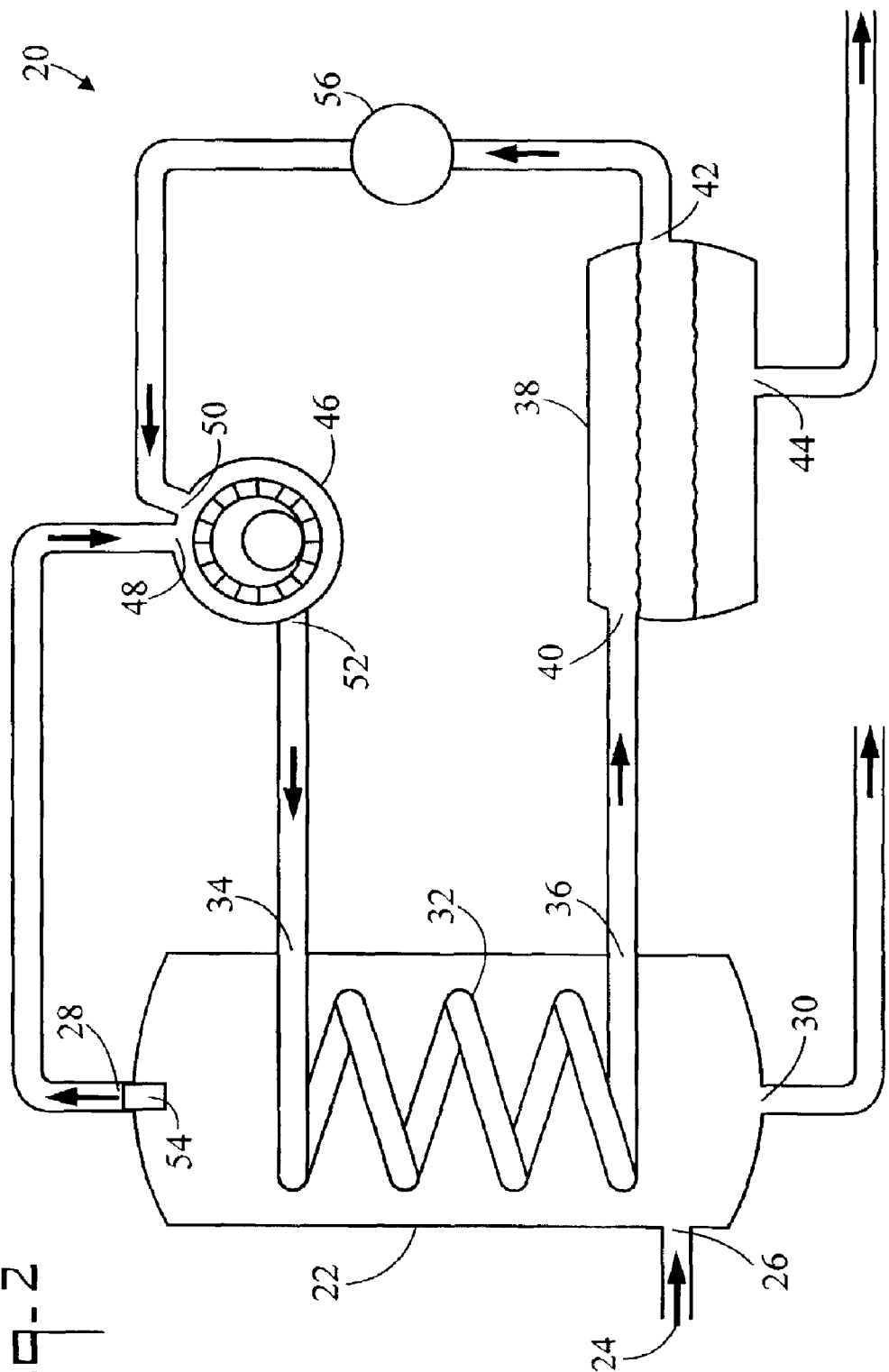
FIG. 2 is a flow diagram showing additional features of the first system.

Referring now to FIG. 2, there is illustrated a flow diagram showing additional features of the first system 20. A mist eliminator 54 is disposed between evaporator 22 and compressor 46. Mist eliminator 54 serves as a filter which captures water soluble material contained within entrained water droplets with the steam. Mist eliminator 54 can be located at any convenient location between evaporator 22 and compressor 46. Also, an hydrophobic liquid pump 56 is disposed between water/hydrophobic liquid separator 38 and compressor 46. Hydrophobic liquid pump 56 pumps hydrophobic liquid from hydrophobic liquid output 42 of water/hydrophobic liquid separator 38 to the hydrophobic liquid input 50 of compressor 46. In the embodiment shown in FIG. 1, a vacuum created by compressor 46 pulls hydrophobic liquid from water/hydrophobic liquid separator 38 to compressor 46. However, in certain applications pump 56 has been found useful. It may be appreciated that mist eliminator 54 and hydrophobic liquid pump 56 may be added individually or in combination to other embodiments of the present invention subsequently discussed herein.

In view of the aforementioned system 20, a method for using a hydrophobic liquid to compress steam includes:

(a) providing steam;

(b) providing a hydrophobic liquid;

(c) providing a compressor 46 having a steam input 48, a hydrophobic liquid input 50, and a compressed steam-hydrophobic liquid output 52;

(d) routing the steam to the steam input 48 of compressor 46;

(e) routing the hydrophobic liquid to hydrophobic liquid input 50 of compressor 46; and, (e) obtaining a mixture of compressed steam and hydrophobic liquid from the compressed steam-hydrophobic liquid output 52 of compressor 46.

During the compression process, it is the steam and not the hydrophobic liquid which is compressed by compressor 46.

Further in view of system 20, a method for using a hydrophobic liquid to remove water soluble material from an aqueous solution includes:

(a) providing an aqueous solution containing water soluble material;

(b) providing a hydrophobic liquid;

(c) providing system 20 (described above) for removing the water soluble material from the aqueous solution;

(d) delivering the aqueous solution 24 to the aqueous solution input 26 of evaporator 22;

(e) compressor 46 compressing a mixture of steam from evaporator 22 and the hydrophobic liquid, thereby increasing the temperature of the mixture;

(f) routing the mixture from the compressed steam-hydrophobic liquid output 52 of compressor 46 to the compressed steam-hydrophobic liquid input 34 of heat exchanger 32 and thence through heat exchanger 32, thereby evaporating the aqueous solution and causing steam to be routed from the steam output 28 of evaporator 22 to steam input 48 of compressor 46;

(g) routing water and hydrophobic liquid from the water-hydrophobic liquid output 36 of heat exchanger 32 to the water-hydrophobic liquid input 40 of the water/hydrophobic liquid separator 38; and, (h) routing the hydrophobic liquid from the hydrophobic liquid output 42 of the water/hydrophobic liquid separator 38 to the hydrophobic liquid input 50 of compressor 46.

The, method further including:
  removing a concentrated aqueous solution containing water soluble material from the concentrated aqueous solution output 30 of evaporator 22. The concentrated solution can be disposed of in conventional ways or, as appropriate, recycled.

The method further including:
  removing water condensate from the water condensate output 44 of water/hydrophobic liquid separator 38. The condensate typically comprises water of a quality which can be recycled or routed to a water drain.

The method further including:
  in step (c), a mist eliminator 54 disposed between evaporator 22 and compressor 46. Mist eliminator 54 capturing water soluble material contained within entrained water droplets with the steam.

The method further including:
  in step (c), an hydrophobic liquid pump 56 disposed between water/hydrophobic liquid separator 38 and compressor 46; and,
  hydrophobic liquid pump 56 pumping hydrophobic liquid from hydrophobic liquid output 42 of water/hydrophobic liquid separator 38 to hydrophobic liquid input 50 of compressor 46.

Figure 3:
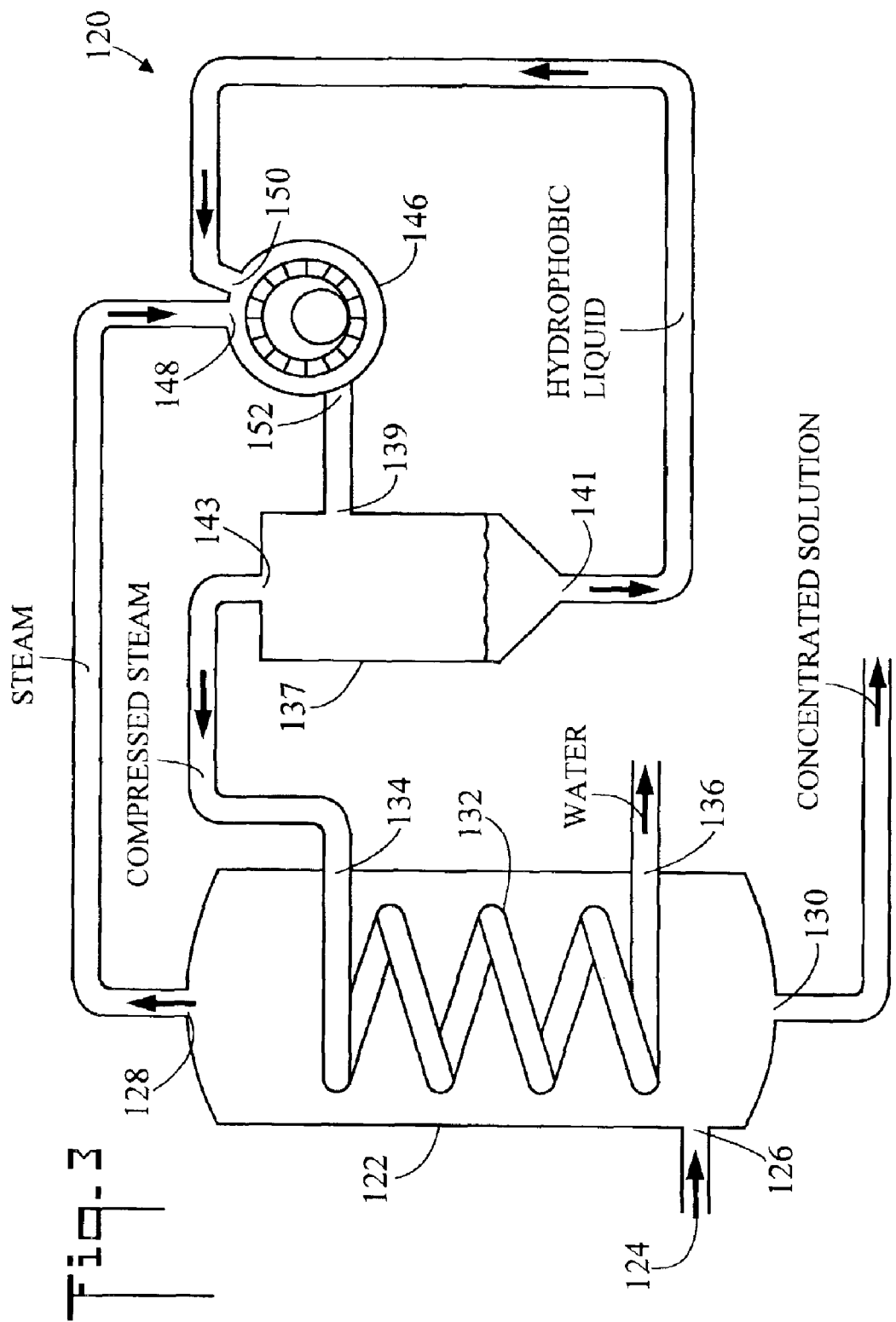
FIG. 3 is a flow diagram of a second system for using a hydrophobic liquid to compress steam; and, FIG. 4 is flow diagram of a third system for using a hydrophobic liquid to compress steam which combines the features of the first and second systems.

Referring now to FIG. 3, there is illustrated a flow diagram of a second system for using a hydrophobic liquid to compress steam, generally designated as 120. In the shown embodiment, second system 120 is utilized for removing a water soluble material from an aqueous solution, and includes an evaporator 122 for receiving the aqueous solution 124, evaporator 122 having an aqueous solution input 126, a steam output 128, and a concentrated aqueous solution output 130. A heat exchanger 132 transfers heat to evaporator 122, the heat exchanger 132 having a compressed steam input 134 and a water output 136. A steam/hydrophobic liquid separator 137 has a compressed steam-hydrophobic liquid input 139, a hydrophobic liquid output 141, and a compressed steam output 143. System 120 further includes a compressor 146 having a steam input 148, a hydrophobic liquid input 150, and a compressed steam-hydrophobic liquid output 152. Steam input 148 of compressor 146 is connected to steam output 128 of evaporator 122, hydrophobic liquid input 150 of compressor 146 is connected to hydrophobic liquid output 141 of steam/hydrophobic liquid separator 137, compressed steam-hydrophobic liquid output 152 of compressor 146 connected to compressed steam-hydrophobic liquid input 139, of steam/hydrophobic liquid separator 137, and compressed steam output 143 of steam/hydrophobic liquid separator 137 is connected to compressed steam input 134 of heat exchanger 132.

In view of system 120, a method for using a hydrophobic liquid to remove water soluble material from an aqueous solution includes:
  (a) providing an aqueous solution containing water soluble material;
  (b) providing a hydrophobic liquid;
  (c) providing system 120 (described above) for removing the water soluble material from the aqueous solution;
  (d) delivering the aqueous solution 124 to the aqueous solution input 126 of evaporator 122;
  (e) compressor 146 compressing a mixture of steam from evaporator 122 and the hydrophobic liquid, thereby increasing the temperature of the mixture;
  (f) routing the mixture from the compressed steam-hydrophobic liquid output 152 of compressor 146 to the compressed steam-hydrophobic liquid input 139 of the steam/hydrophobic liquid separator 137;
  (g) routing compressed steam from compressed steam output 143 of the steam/hydrophobic separator 137 to the compressed steam input 134 of heat exchanger 132 and thence through heat exchanger 132, thereby evaporating the aqueous solution and causing steam to be routed from the steam output 128 of evaporator 122 to the steam input 148 of compressor 146; and,
  (h) routing the hydrophobic liquid from the hydrophobic liquid output 141 of steam/hydrophobic liquid separator 137 to the hydrophobic liquid input 150 of compressor 146.

The method further including:
  removing a concentrated aqueous solution containing water soluble material from the concentrated aqueous solution output 130 of evaporator 122.

The method further including:
  removing water condensate from the water output 136 of heat exchanger 132.

Figure 4:
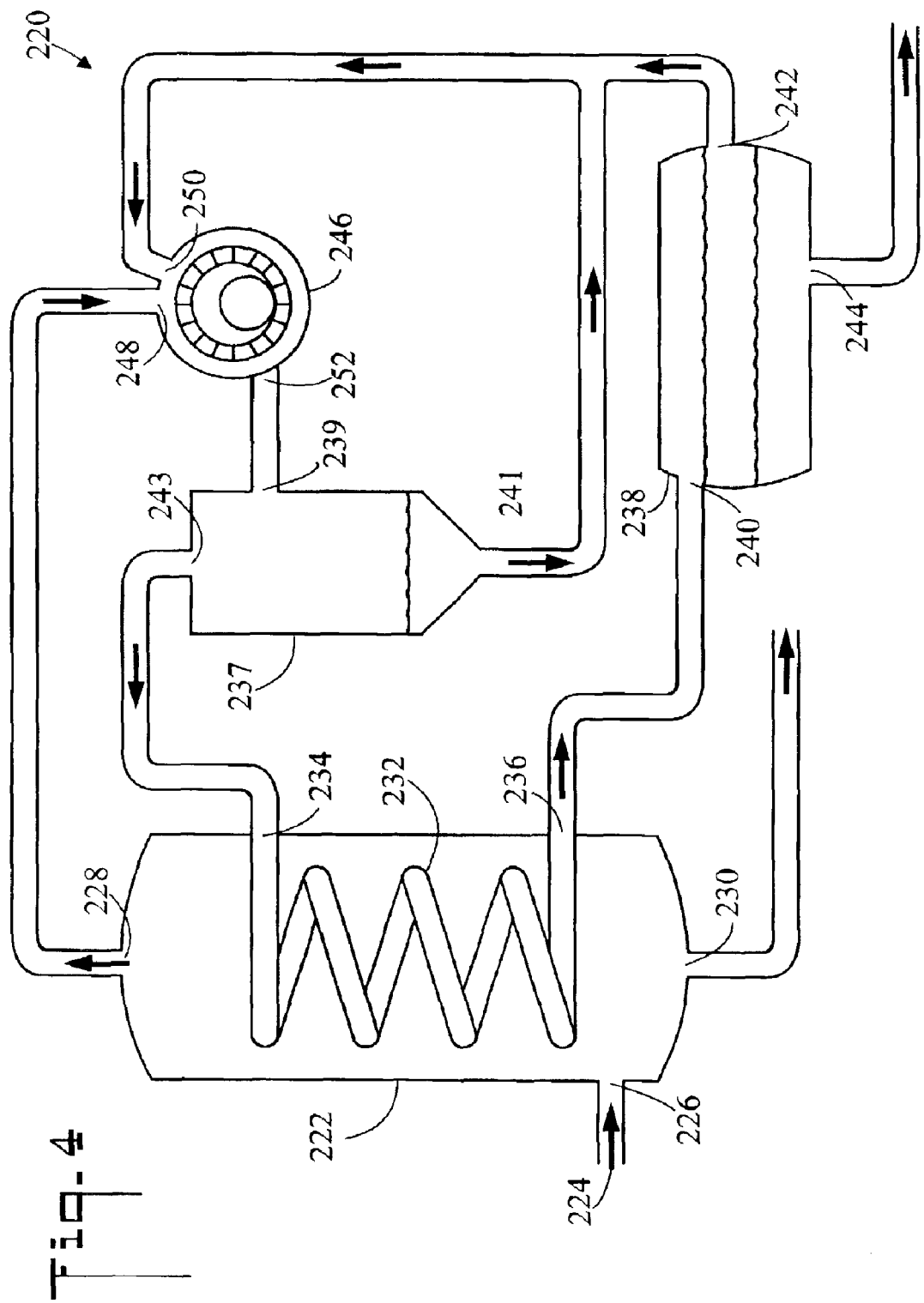

FIG. 4 is flow diagram of a third system for using a hydrophobic liquid to compress steam, generally designated as 220, which combines the features of the first 20 and second 120 systems. In the shown embodiment, third system 220 is utilized for removing a water soluble material from an aqueous solution, and includes an evaporator 222 for receiving the aqueous solution 224, evaporator 222 having an aqueous solution input 226, a steam output 228, and a concentrated aqueous solution output 230. A heat exchanger 232 transfers heat to evaporator 222, heat exchanger 232 having a compressed steam input 234 and a partially pure water output 236. A steam/hydrophobic liquid separator 237 has a compressed steam-hydrophobic liquid input 239, a hydrophobic liquid output 241, and a compressed steam output 243. System 220 further includes a compressor 246 having a steam input 248, a hydrophobic liquid input 250, and a compressed steam-hydrophobic liquid output 252. Steam input 248 of compressor 246 is connected to steam output 228 of evaporator 222, hydrophobic liquid input 250 of compressor 246 is connected to hydrophobic liquid output 241 of steam/hydrophobic liquid separator 237, compressed steam-hydrophobic liquid output 252 of compressor 246 is connected to compressed steam-hydrophobic liquid input 239 of steam/hydrophobic liquid separator 237, compressed steam output 243 of steam/hydrophobic liquid separator 237 is connected to compressed steam input 234 of heat exchanger 232. System 220 further includes a water/hydrophobic liquid separator 238 having an partially pure water input 240, a hydrophobic liquid output 242, and a water condensate output 244. Partially pure water input 240 of water/hydrophobic liquid separator 238 is connected to the partially pure water output 236 of heat exchanger 232, and the hydrophobic liquid output 242 of water/hydrophobic liquid separator 238 is connected to the hydrophobic liquid input 250 of compressor 246.

In view of system 220, a method for using a hydrophobic liquid to remove water soluble material from an aqueous solution includes:
  (a) providing an aqueous solution containing water soluble material;
  (b) providing a hydrophobic liquid;
  (c) providing system 220 (described above) for removing the water soluble material from the aqueous solution;
  (d) delivering an aqueous solution 224 to the aqueous solution input 226 of evaporator 222;
  (e) compressor 246 compressing a mixture of steam from evaporator 222 and the hydrophobic liquid, thereby increasing the temperature of the mixture;

(f) routing the mixture from the compressed steam-hydrophobic liquid output 252 of compressor 246 to the compressed steam-hydrophobic liquid input 239 of steam/hydrophobic liquid separator 237;

(g) routing compressed steam from said compressed steam output 243 of the steam/hydrophobic separator 237 to the compressed steam input 234 of heat exchanger 232 and thence through heat exchanger 232, thereby evaporating the aqueous solution and causing steam to be routed from the steam output 228 of evaporator 222 to the steam input 248 of compressor 246;

(h) routing hydrophobic liquid from the hydrophobic liquid output 241 of steam/hydrophobic liquid separator 237 to the hydrophobic liquid input 250 of compressor 246.

(i) routing the partially pure water from the partially pure water output 236 of heat exchanger 232 to the partially pure water input 240 of water/hydrophobic liquid separator 238; and, (j) routing hydrophobic liquid from the hydrophobic liquid output 242 of water/hydrophobic liquid separator 238 to the hydrophobic liquid input 250 of compressor 246.

The method further including:

removing a concentrated aqueous solution containing water soluble material from the concentrated aqueous solution output 230 of evaporator 246.

The method further including:

removing water condensate from the water condensate output 244 of water/hydrophobic liquid separator 238.

It is noted that in system 220, both the steam/hydrophobic liquid separator 237 and the water/hydrophobic liquid separator 238 are utilized to remove the hydrophobic liquid from the final water condensate. After the first separation, the water emanating from heat exchanger 232 is "partially pure". The water/hydrophobic liquid separator 238 then serves to further purify the condensate water.

The preferred embodiments of the invention described herein are exemplary and numerous modifications, variations, and rearrangements can be readily envisioned to achieve an equivalent result, all of which are intended to be embraced within the scope of the appended claims.

I claim:

1. A method for using a hydrophobic liquid to remove water soluble material from an aqueous solution, comprising:

(a) providing said aqueous solution containing said water soluble material;

(b) providing said hydrophobic liquid;

(c) providing a system for removing said water soluble material from said aqueous solution, said system including:

an evaporator for receiving said aqueous solution, said evaporator having an aqueous solution input, a steam output, and a concentrated aqueous solution output;

a heat exchanger which transfers heat to said evaporator, said heat exchanger having a compressed steam and hydrophobic liquid input and a water and hydrophobic liquid output;

a water from hydrophobic liquid separator having a water and hydrophobic liquid input, a hydrophobic liquid output, and a water condensate output;

a compressor having a steam input, a hydrophobic liquid input, and a compressed steam and hydrophobic liquid output, said steam input of said compressor connected to said steam output of said evaporator, said hydrophobic liquid input of said compressor connected to said hydrophobic liquid output of said water from hydrophobic liquid separator, and said compressed steam and hydrophobic liquid output of said compressor connected to said compressed steam and hydrophobic liquid input of said heat exchanger; and, said water and hydrophobic liquid input of said water from hydrophobic liquid separator connected to said water and hydrophobic liquid output of said heat exchanger;

(d) delivering said aqueous solution to said aqueous solution input of said evaporator;

(e) said compressor compressing a mixture of steam from said evaporator and said hydrophobic liquid, thereby increasing the temperature of said mixture;

(f) routing said mixture from said compressed steam and hydrophobic liquid output of said compressor to said compressed steam and hydrophobic liquid input of said heat exchanger and thence through said heat exchanger, thereby evaporating said aqueous solution and causing said steam to be routed from said steam output of said evaporator to said steam input of said compressor;

(g) routing water and said hydrophobic liquid from said water and hydrophobic liquid output of said heat exchanger to said water and hydrophobic liquid input of said water from hydrophobic liquid separator;

(h) routing said hydrophobic liquid from said hydrophobic liquid output of said water from hydrophobic liquid separator to said hydrophobic liquid input of said compressor; and, (i) removing a concentrated aqueous solution containing water soluble material from said concentrated aqueous solution output of said evaporator.

2. The method according to claim 1, further including:

removing water condensate from said water condensate output of said water from hydrophobic liquid separator.

3. The method according to claim 1, further including:

in step (c), a mist eliminator disposed between said evaporator and said compressor.

4. The method according to claim 2, further including:

in step (c), an hydrophobic liquid pump disposed between said water from hydrophobic liquid separator and said compressor; and, said hydrophobic liquid pump pumping hydrophobic liquid from said hydrophobic liquid output of said water from hydrophobic liquid separator to said hydrophobic liquid input of said compressor.

5. The method according to claim 1, further including;

in step (b), said hydrophobic liquid being mineral oil.

6. The method according to claim 1, further including;

in step (c), said compressor being a liquid piston pump.

7. A method for using a hydrophobic liquid to remove water soluble material from an aqueous solution, comprising:

(a) providing said aqueous solution containing said water soluble material;

(b) providing said hydrophobic liquid;

(c) providing a system for removing said water soluble material from said aqueous solution, said system including:

an evaporator for receiving said aqueous solution, said evaporator having an aqueous solution input, a steam output, and a concentrated aqueous solution output;

a heat exchanger which transfers heat to said evaporator, said heat exchanger having a compressed steam input and a water output;

a steam from hydrophobic liquid separator having a compressed steam and hydrophobic liquid input, a hydrophobic liquid output, and a compressed steam output;

a compressor having a steam input, a hydrophobic liquid input, and a compressed steam and hydrophobic liquid output, said steam input of said compressor connected to said steam output of said evaporator, said hydrophobic liquid input of said compressor connected to said hydrophobic liquid output of said steam from hydrophobic liquid separator, and said compressed steam and hydrophobic liquid output of said compressor connected to said compressed steam and hydrophobic liquid input of said steam from hydrophobic liquid separator;

said compressed steam output of said steam from hydrophobic liquid separator connected to said compressed steam input of said heat exchanger;

(d) delivering said aqueous solution to said aqueous solution input of said evaporator;

(e) said compressor compressing a mixture of steam from said evaporator and said hydrophobic liquid, thereby increasing the temperature of said mixture;

(f) routing said mixture from said compressed steam and hydrophobic liquid output of said compressor to said compressed steam and hydrophobic liquid input of said steam from hydrophobic liquid separator;

(g) routing compressed steam from said compressed steam output of said steam from hydrophobic separator to said compressed steam input of said heat exchanger and thence through said heat exchanger, thereby evaporating said aqueous solution and causing said steam to be routed from said steam output of said evaporator to said steam input of said compressor;

(h) routing said hydrophobic liquid from said hydrophobic liquid output of said steam from hydrophobic liquid separator to said hydrophobic liquid input of said compressor;

removing a concentrated aqueous solution containing water soluble material from said concentrated aqueous solution output of said evaporator.

8. The method according to claim 7, further including:
removing water condensate from said water output of said heat exchanger.

9. The method according to claim 7, further including:
in step (c), a mist eliminator disposed between said evaporator and said compressor.

10. The method according to claim 7, further including:
in step (c), a hydrophobic liquid pump disposed between said steam from hydrophobic liquid separator and said compressor; and,
said hydrophobic liquid pump pumping hydrophobic liquid from said hydrophobic liquid output of said steam from hydrophobic liquid separator to said hydrophobic liquid input of said compressor.

11. The method according to claim 7, further including:
in step (b), said hydrophobic liquid being mineral oil.

12. The method according to claim 7, further including:
in step (c), said compressor being a liquid piston pump.

13. A method for using a hydrophobic liquid to remove water soluble material from an aqueous solution, comprising:

(a) providing said aqueous solution containing said water soluble material;

(b) providing said hydrophobic liquid;

(c) providing a system for removing said water soluble material from said aqueous solution, said system including:

an evaporator for receiving said aqueous solution, said evaporator having an aqueous solution input, a steam output, and a concentrated aqueous solution output;

a heat exchanger which transfers heat to said evaporator, said heat exchanger having a compressed steam input and a water output;

a steam from hydrophobic liquid separator having a compressed steam and hydrophobic liquid input, a hydrophobic liquid output, and a compressed steam output;

a compressor having a steam input, a hydrophobic liquid input, and a compressed steam and hydrophobic liquid output, said steam input of said compressor connected to said steam output of said evaporator, said hydrophobic liquid input of said compressor connected to said hydrophobic liquid output of said steam from hydrophobic liquid separator, and said compressed steam and hydrophobic liquid output of said compressor connected to said compressed steam and hydrophobic liquid input of said steam from hydrophobic liquid separator;

said compressed steam output of said steam from hydrophobic liquid separator connected to said compressed steam input of said heat exchanger;

a water from hydrophobic liquid separator having a water input, a hydrophobic liquid output, and a water condensate output, said water input of said water from hydrophobic liquid separator connected to said water output of said heat exchanger, and said hydrophobic liquid output of said water from hydrophobic liquid separator connected to said hydrophobic liquid input of said compressor;

(d) delivering said aqueous solution to said aqueous solution input of said evaporator;

(e) said compressor compressing a mixture of steam from said evaporator and said hydrophobic liquid, thereby increasing the temperature of said mixture;

(f) routing said mixture from said compressed steam and hydrophobic liquid output of said compressor to said compressed steam and hydrophobic liquid input of said steam from hydrophobic liquid separator;

(g) routing compressed steam from said compressed steam output of said steam from hydrophobic separator to said compressed steam input of said heat exchanger and thence through said heat exchanger, thereby evaporating said aqueous solution and causing said steam to be routed from said steam output of said evaporator to said steam input of said compressor;

(h) routing said hydrophobic liquid from said hydrophobic liquid output of said steam from hydrophobic liquid separator to said hydrophobic liquid input of said compressor;

(i) routing water from said water output of said heat exchanger to said water input of said water from hydrophobic liquid separator;

(j) routing said hydrophobic liquid from said hydrophobic liquid output of said water from hydrophobic liquid separator to said hydrophobic liquid input of said compressor; and, (i) removing a concentrated aqueous solution containing water soluble material from said concentrated aqueous solution output of said evaporator.

14. The method according to claim 13, further including:

removing water condensate from said water condensate output of said water from hydrophobic liquid separator.

15. The method according to claim 13, further including:

in step (c), a mist eliminator disposed between said evaporator and said compressor.

16. The method according to claim 13, further including:

in step (c), a hydrophobic liquid pump disposed between said steam from hydrophobic liquid separator and said compressor; and, said hydrophobic liquid pump pumping hydrophobic liquid from said hydrophobic liquid output of said steam from hydrophobic liquid separator to said hydrophobic liquid input of said compressor.

17. The method according to claim 13, further including:

in step (b), said hydrophobic liquid being mineral oil.

18. The method according to claim 13, further including;

in step (c), said compressor being a liquid piston pump.

* * * * *